(12) United States Patent
Takahashi

(10) Patent No.: US 10,992,830 B2
(45) Date of Patent: Apr. 27, 2021

(54) INFORMATION PROCESSING TERMINAL HAVING OPERABLE OBJECTS ON A SCREEN, INFORMATION PROCESSING SYSTEM HAVING OPERABLE OBJECTS ON A SCREEN, AND OPERATION SCREEN DISPLAY METHOD REGARDING OPERABLE OBJECT

(71) Applicant: Rina Takahashi, Kanagawa (JP)

(72) Inventor: Rina Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/718,432

(22) Filed: Dec. 18, 2019

(65) Prior Publication Data

US 2020/0220988 A1    Jul. 9, 2020

(30) Foreign Application Priority Data

Jan. 4, 2019    (JP) .............................. JP2019-000225

(51) Int. Cl.
*G06F 3/12* (2006.01)
*H04N 1/00* (2006.01)

(52) U.S. Cl.
CPC ....... *H04N 1/00411* (2013.01); *H04N 1/0009* (2013.01); *H04N 1/00076* (2013.01); *H04N 2201/0094* (2013.01)

(58) Field of Classification Search
None
See application file for complete search history.

(56) References Cited

U.S. PATENT DOCUMENTS

| 2012/0086970 | A1 | 4/2012 | Takahashi |
| 2012/0268796 | A1 | 10/2012 | Takahashi |
| 2013/0063774 | A1* | 3/2013 | Nuggehalli ........... G06F 3/1298 358/1.15 |
| 2013/0070282 | A1 | 3/2013 | Takahashi |
| 2013/0107284 | A1* | 5/2013 | Hayashi ............. H04N 1/00474 358/1.2 |
| 2013/0201529 | A1* | 8/2013 | Morita ............... H04N 1/32122 358/402 |
| 2014/0010566 | A1 | 1/2014 | Takahashi et al. |
| 2014/0294421 | A1 | 10/2014 | Takahashi et al. |
| 2017/0075554 | A1* | 3/2017 | Sasayama ........... G06F 3/04845 |

(Continued)

FOREIGN PATENT DOCUMENTS

| JP | 2005-292975 | 10/2005 |
| JP | 2018-014079 | 1/2018 |

*Primary Examiner* — Henok Shiferaw
(74) *Attorney, Agent, or Firm* — IPUSA, PLLC

(57) ABSTRACT

An information processing terminal includes one or more processors configured to: display a plurality of input fields to which setting values for a process are to be input, the plurality of input fields being arranged side by side in a vertical direction of an operation screen; display a first object that receives an execution request operation for the process, the first object being provided at a lower right of the operation screen; cause the process to be performed based on the setting values in the plurality of input fields in response to the execution request operation for the process; display a second object that accepts a log display operation for the process, the second object being provided between the plurality of input fields and the first object; and display a log of the process in response to the log display operation for the process.

5 Claims, 16 Drawing Sheets

(56) References Cited

U.S. PATENT DOCUMENTS

| | | |
|---|---|---|
| 2018/0013913 A1 | 1/2018 | Hayashi et al. |
| 2018/0068345 A1* | 3/2018 | Hirokawa .......... H04N 1/00941 |
| 2018/0084140 A1* | 3/2018 | Yagiura ............. H04N 1/32112 |
| 2018/0152430 A1 | 5/2018 | Takahashi |
| 2018/0278756 A1* | 9/2018 | Shibukawa ........ H04N 1/00474 |
| 2019/0129669 A1 | 5/2019 | Takahashi et al. |
| 2019/0220237 A1* | 7/2019 | Maeda ................. G06F 3/1273 |
| 2020/0034097 A1* | 1/2020 | Omori ................ H04N 1/00411 |
| 2020/0296238 A1* | 9/2020 | Nishiyama ......... H04N 1/00503 |

* cited by examiner

| | ✱✱✱✱✱✱✱ CORPORATION | ? | |
|---|---|---|---|
| ← | EXECUTION LOG OF AllPattern OneScreen | | |

| START TIME AND DATE | END TIME AND DATE | STATUS | UPDATE |
|---|---|---|---|
| 2018/11/29 15:46:00 | 2018/11/29 15:46:02 | ERROR | |
| 2018/11/29 15:44:39 | 2018/11/29 15:44:42 | ERROR | |
| 2018/11/28 17:05:13 | 2018/11/28 17:05:17 | ERROR | |
| 2018/11/28 16:25:39 | 2018/11/28 16:25:42 | ERROR | |
| 2018/11/26 9:53:16 | 2018/11/26 9:53:28 | COMPLETE | |

} 1310

CHECK STATUS | 0000/00/00 00:00 | ↶ | ⌂ | ⚙ | 🔒 | ⊘ | STOP

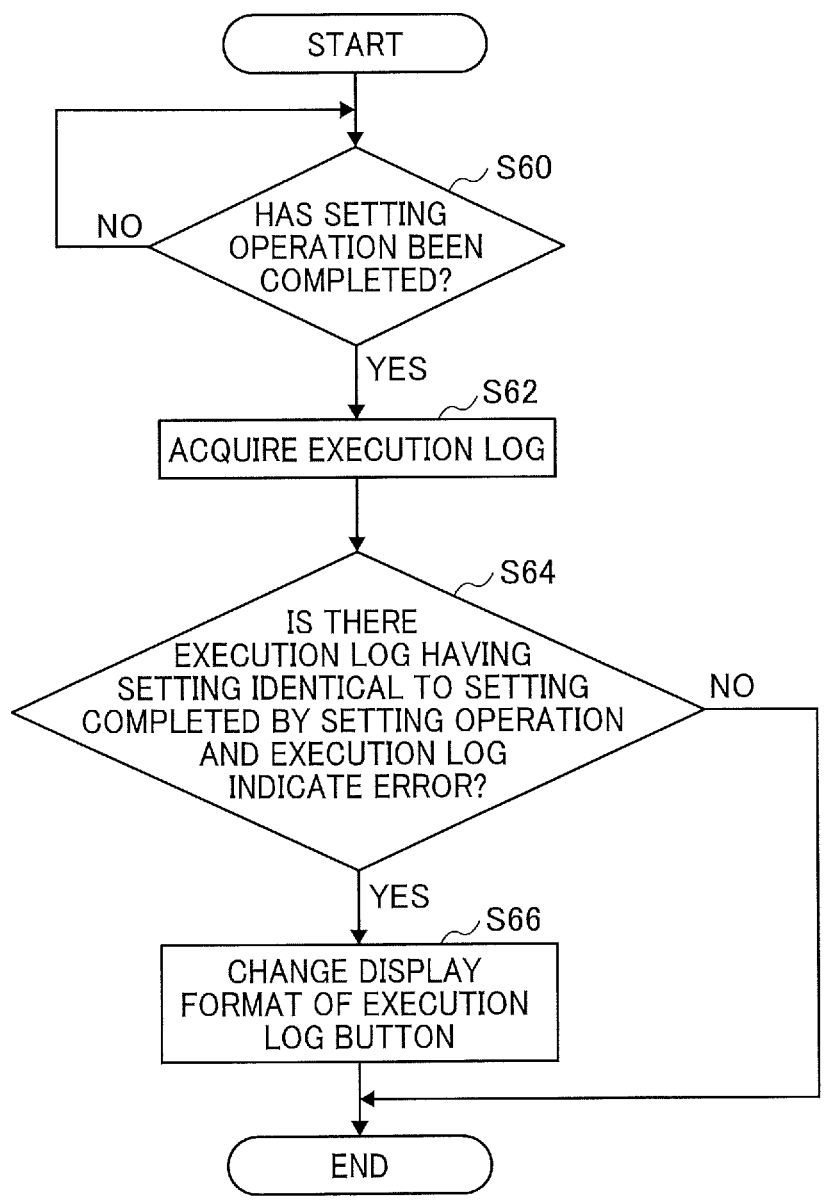

INFORMATION PROCESSING TERMINAL HAVING OPERABLE OBJECTS ON A SCREEN, INFORMATION PROCESSING SYSTEM HAVING OPERABLE OBJECTS ON A SCREEN, AND OPERATION SCREEN DISPLAY METHOD REGARDING OPERABLE OBJECT

CROSS-REFERENCE TO RELATED APPLICATIONS

This patent application is based on and claims priority pursuant to 35 U.S.C. § 119(a) to Japanese Patent Application No. 2019-000225, filed on Jan. 4, 2019, in the Japan Patent Office, the entire disclosure of which is hereby incorporated by reference herein.

BACKGROUND

Technical Field

The present disclosure relates to an information processing terminal, an information processing system, and an operation screen display method.

Description of the Related Art

Jobs executed by for example a multifunction peripheral include jobs that involve inputting to and outputting from an external unit, such as scanning or printing, as well as jobs for which all the processes are completed by the MFP, such as copying. With regard to jobs, such as printing, for which data is received from an external unit, the process after the data is received from the external unit is performed by the MFP. As for jobs, such as scanning, for transmitting data to an external unit, the MFP first performs a reading operation and then transmits data to the external unit.

If the MFP does not perform a process in the latter part of the job, another job is executed by the MFP while the job is executed by other than the MFP, whereby it is possible to improve the convenience. One can confirm the execution result of the process by checking the execution log, which is displayed when, for example, a job execution log button is pressed.

There is a related art for, for example, improving the operability of the button displayed on a display device through a user interface (hereinafter referred to as UI) that accepts an operation performed on the displayed button via an input device.

SUMMARY

According to an embodiment of the present disclosure, an information processing terminal includes one or more processors configured to: display a plurality of input fields to which setting values for a process are to be input, the plurality of input fields being arranged side by side in a vertical direction of an operation screen displayed on the information processing terminal; display a first object that receives an execution request operation for the process from a user, the first object being provided at a lower right of the operation screen; cause the process to be performed based on the setting values in the plurality of input fields in response to the execution request operation for the process received from the user; display a second object that accepts a log display operation for the process from a user, the second object being provided between the plurality of input fields and the first object; and display a log of the process in response to the log display operation for the process received from the user.

BRIEF DESCRIPTION OF THE SEVERAL VIEWS OF THE DRAWINGS

A more complete appreciation of the disclosure and many of the attendant advantages and features thereof can be readily obtained and understood from the following detailed description referring to the accompanying drawings, wherein:

FIG. 11 is a schematic diagram illustrating an example of an execution log confirmation screen including an execution log, according to an embodiment of the present disclosure;

FIG. 17 is a flowchart illustrating an example of a process of changing a display form of the execution log button in a case where a setting in a setting area is identical to a job setting that has previously caused an error, according to an embodiment of the present disclosure.

Figure 1:
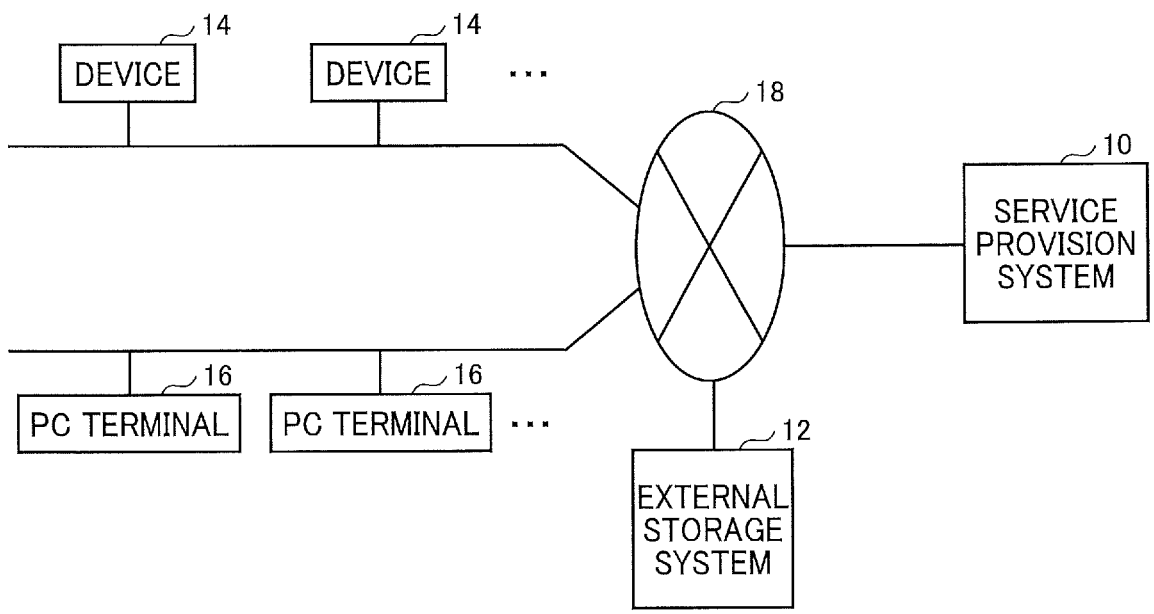
FIG. 1 is a schematic diagram illustrating an example of a configuration of an information processing system, according an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present invention are described in detail referring to the drawings.

First Embodiment

System Configuration

First, referring to FIG. 1, an example of the system configuration of an information processing system 1 according to the present embodiment is described. FIG. 1 is a schematic diagram illustrating an example of the configuration of the information processing system 1 according to the present embodiment. The information processing system 1 illustrated in FIG. 1 includes a service provision system 10, an external storage system 12, one or more devices 14, and one or more PC terminals 16. The service provision system 10, the external storage system 12, the devices 14, and the PC terminals 16 are communicatively connected to one another via a network 18 such as the Internet or a local area network (LAN).

The service provision system 10 is implemented by using one or more information processing apparatuses to provide various services via the network 18. Examples of the services provided by the service provision system 10 according to the present embodiment are described later.

The external storage system 12 is implemented by using one or more information processing apparatuses to provide a service called online storage via the network 18. The external storage system 12 provides a storage area for a storage. According to the present embodiment, the storage area provided by the external storage system 12 is the storage area for folders or files.

The device 14 is an example of an information processing terminal operated by a user. The device 14 is, for example, an image forming device. The image forming device is an MFP, a printer, a scanner, a facsimile apparatus, etc.

The device 14 can be any device other than an image forming device as long as the device has a communication function. For example, the device 14 can be a projector (PJ), an interactive white board (IWB) (a white board having the function as an electronic blackboard and enabling the mutual communication), an output device such as digital signage, a head-up display (HUD) device, an industrial machine, an imaging device, a sound collector, a medical device, a network home appliance, an automobile (connected car), a notebook PC (personal computer), a mobile phone, a smartphone, a tablet terminal, a game machine, a personal digital assistant (PDA), a digital camera, a wearable PC, or a desktop PC.

The PC terminal 16 is also an example of an information processing terminal operated by a user. The PC terminal 16 is, for example, a notebook PC, a desktop PC, a wearable PC, a mobile phone, a smartphone, a tablet terminal, a game machine, or a PDA. The user operates the device 14 and the PC terminal 16 to use various services provided by the service provision system 10.

The configuration of the information processing system 1 illustrated in FIG. 1 is an example. For example, the service provision system 10 can use a storage area for folders or files other than the external storage system 12. The service provision system 10 can be implemented by a plurality of computer systems that operate in cooperation with one another.

Hardware Configuration

Computer

Figure 2:
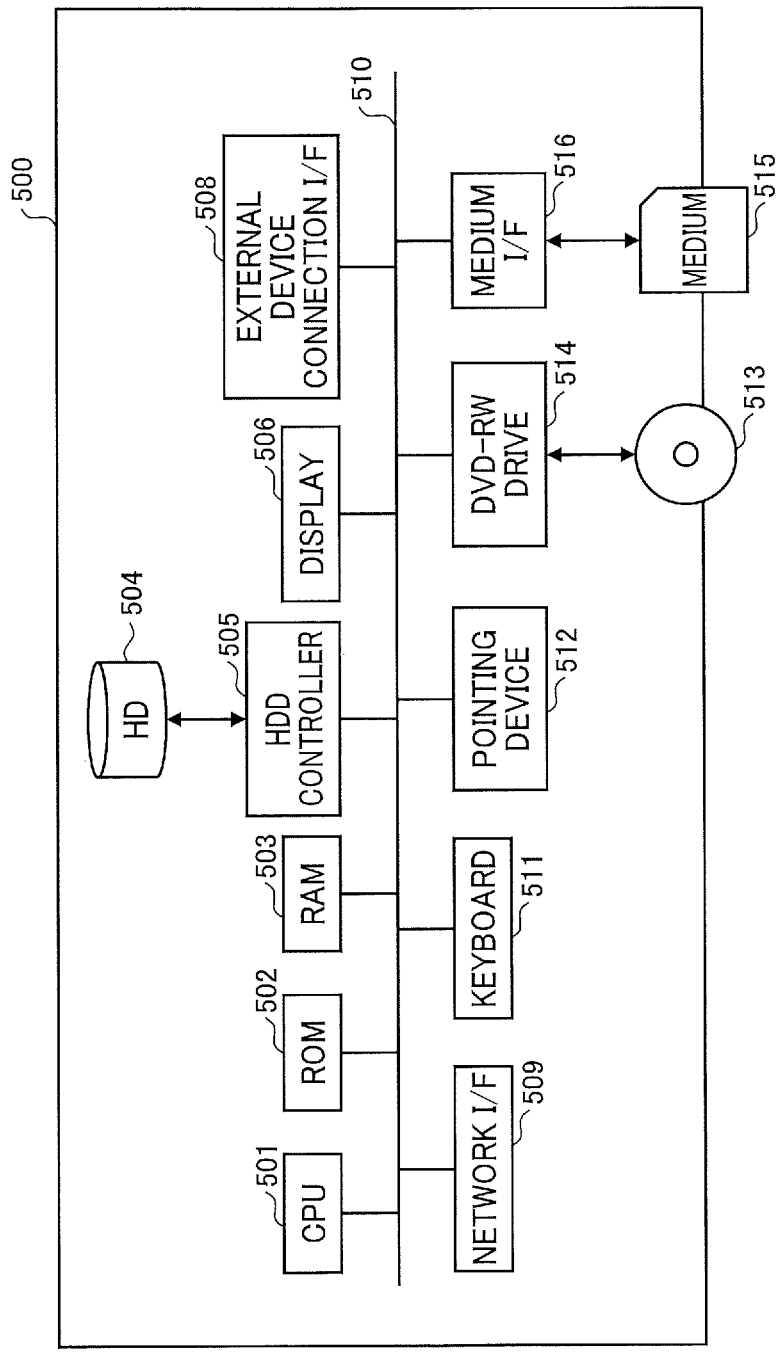
FIG. 2 is a block diagram illustrating an example of a hardware configuration of a computer, according to an embodiment of the present disclosure.

The service provision system 10, the external storage system 12, and the PC terminal 16 are implemented by using, for example, a computer 500 having the hardware configuration illustrated in FIG. 2. In a case where the device 14 is a PC, the device 14 is implemented by using, for example, the computer 500 having the hardware configuration illustrated in FIG. 2.

FIG. 2 is a block diagram illustrating an example of the hardware configuration of the computer 500 according to the present embodiment. As illustrated in FIG. 2, the computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a medium I/F 516.

The CPU 501 controls the overall operation of the computer 500. The ROM 502 stores programs, such as Initial Program Loader (IPL), used to drive the CPU 501. The RAM 503 is used as a work area for the CPU 501. The RD 504 stores various types of data for such as programs. The HDD controller 505 controls reading and writing of various types of data to and from the HD 504 under the control of the CPU 501. The display 506 presents various types of information such as cursor, menu, window, character, or image. The external device connection I/F 508 is an interface for connecting various external devices. In this case, the external device is, for example, a Universal Serial Bus (USB) memory or a printer. The network I/F 509 is an interface for the data communication via the network 18. The data bus 510 is an address bus, a data bus, etc. for electrically coupling the components, such as the CPU 501.

The keyboard 511 is one type of input unit including a plurality of keys to input characters, numerical values, various instructions, etc. The pointing device 512 is one type of input unit to, for example, select or execute various instructions, select the processing target, or move the cursor. The DVD-RW drive 514 controls the reading or writing of various types of data from or to a DVD-RW 513 that is an example of a removable recording medium. DVD-R, etc. as well as DVD-RW may be used. The medium I/F 516 controls the reading or writing (storing) of data from or to a recording medium 515 such as a flash memory.

Device

Figure 3:
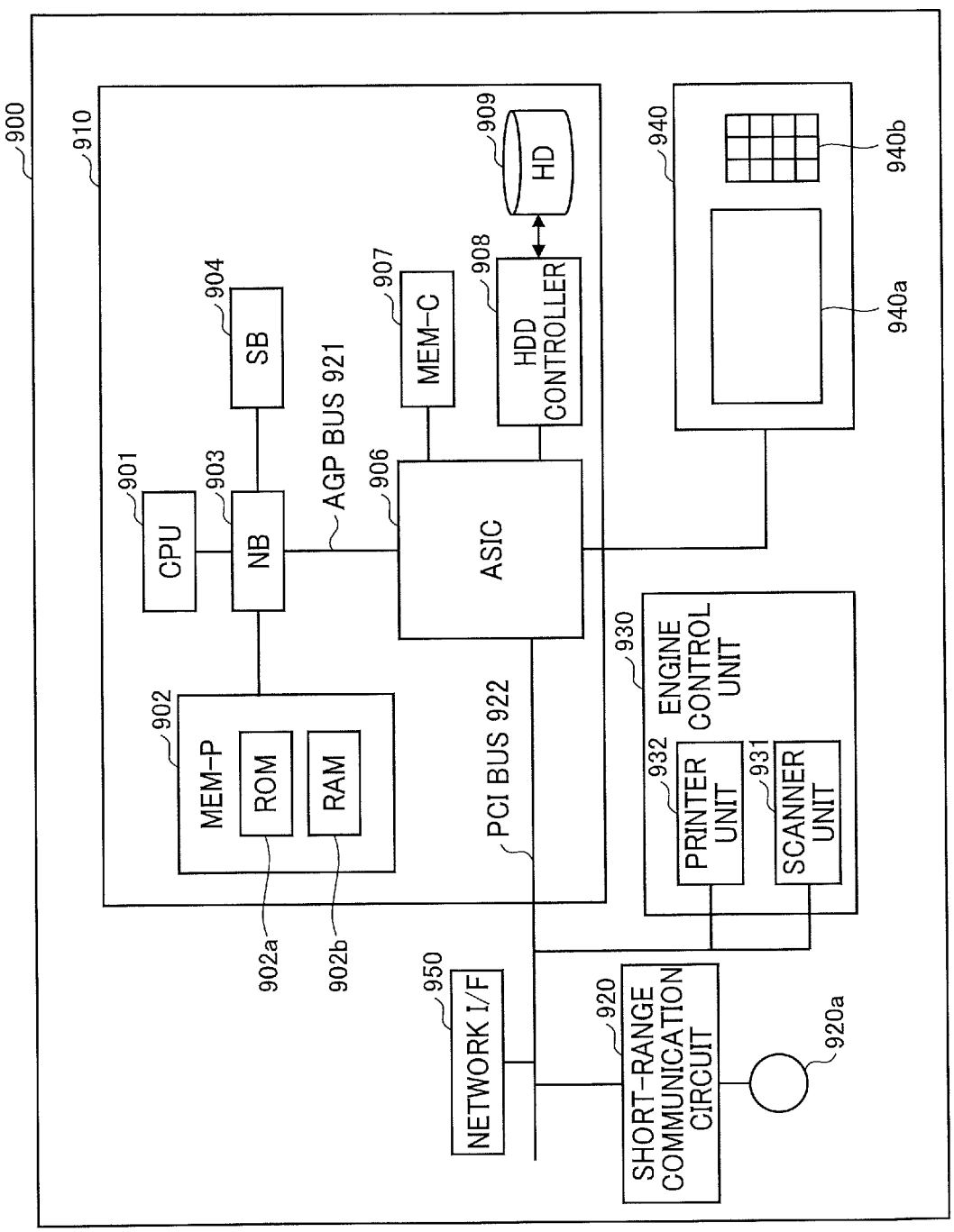
FIG. 3 is a block diagram illustrating an example of a hardware configuration of a multifunction peripheral (MFP), according to an embodiment of the present disclosure.

In a case where the device 14 included in the information processing system 1 is a multifunction peripheral, product, or printer (MFP) 900, the hardware configuration of the MFP 900 is as illustrated in for example FIG. 3. FIG. 3 is a block diagram illustrating an example of the hardware configuration of the MFP 900 according to the present embodiment. As illustrated in FIG. 3, the MFP 900 includes a controller 910, a short-range communication circuit 920, an engine control unit 930, a control panel 940, and a network I/F 950.

The controller 910 includes, as the primary part of the computer, a CPU 901, a system memory (MEM-P) 902, a north bridge (NB) 903, a south bridge (SB) 904, an application specific integrated circuit (ASIC) 906, a local memory (MEM-C) 907 as a storage unit, an HDD controller 908, and an HD 909 as a storage unit. The NB 903 and the ASIC 906 are coupled to each other via an accelerated graphics port (AGP) bus 921.

The CPU 901 is a control unit that performs the overall control on the MFP 900. The NB 903 is a bridge to couple the CPU 901, the MEM-P 902, the SB 904, and the AGP bus 921. The NB 903 includes a memory controller that controls, for example, the reading and writing from and to the MEM-P 902, a Peripheral Component Interconnect (PCI) master, and an AGP target.

The MEM-P 902 includes a ROM 902a that is a memory that stores programs and data for performing each function of the controller 910, and a RAM 902b that is used as, for example, a memory to load programs or data and execute drawing for printing from the memory. A program stored in the RAM 902b may be provided by being recorded in a recording medium readable by a computer, such as a CD-ROM, CD-R, or DVD, in the form of file installable or executable.

The SB 904 is a bridge to couple the NB 903 to a PCI device or a peripheral device. The ASIC 906 is an integrated circuit (IC) used for image processing including a hardware element used for image processing. The ASIC 906 serves as a bridge to couple the AGP bus 921, a PCI bus 922, the HDD controller 908, and the MEM-C 907. The ASIC 906 includes a PCI target, an AGP master, an arbiter (ARB) that is the core of the ASIC 906, a memory controller that controls the MEM-C 907, a plurality of Direct Memory Access Controllers (DMACs) that, for example, rotates image data by using a hardware logic, etc., and a PCI unit that transfers data to a scanner unit 931 and a printer unit 932 via the PCI bus 922. The ASIC 906 may be coupled to a Universal Serial Bus (USB) interface or an Institute of Electrical and Electronics Engineers 1394 (IEEE 1394) interface.

The MEM-C 907 is a local memory used as a copy image buffer and a code buffer. The HD 909 is a storage to store image data, store font data used during printing, and store a format. The HDD controller 908 controls reading and/or writing of data from or to the HD 909 under the control of the CPU 901. The AGP bus 921 is a bus interface for a graphics accelerator card proposed to increase the speed of graphics processing. The AGP bus 921 directly accesses the MEM-P 902 at a high throughput to increase the speed of the graphics accelerator card.

The short-range communication circuit 920 includes a short-range communication circuit antenna 920a. The short-range communication circuit 920 is a communication circuit for a near field communication (NFC), Bluetooth (registered trademark), etc.

The engine control unit 930 includes the scanner unit 931 and the printer unit 932. The control panel 940 includes a panel display 940a and various keys 940b. The panel display 940a is implemented by, for example, a touch panel, which displays, for example, current setting values, a selection screen, and/or a start key (icon) that receives a copy start instruction, and receives an input from an operator. The keys 940b, which include a numeric keypad that receives set values of various image forming parameters such as image density parameter. The controller 910 controls the entire MFP 900 to control for example drawing, communication, and input from the control panel 940. At least one of the scanner unit 931 and the printer unit 932 includes an image processing unit for error diffusion, gamma conversion, etc.

The MFP 900 allows the document box function, the copy function, the print function, and the facsimile function to be sequentially selected by using an application selection key on the control panel 940. The document box mode is set when the document box function is selected. The copy mode is set when the copy function is selected. The print mode is set when the print function is selected. The facsimile mode is set when the facsimile mode is selected.

The network I/F 950 is an interface for the data communication via the network 18. The short-range communication circuit 920 and the network I/F 950 are electrically coupled to the ASIC 906 via the PCI bus 922.

Functional Configuration

Figure 4:
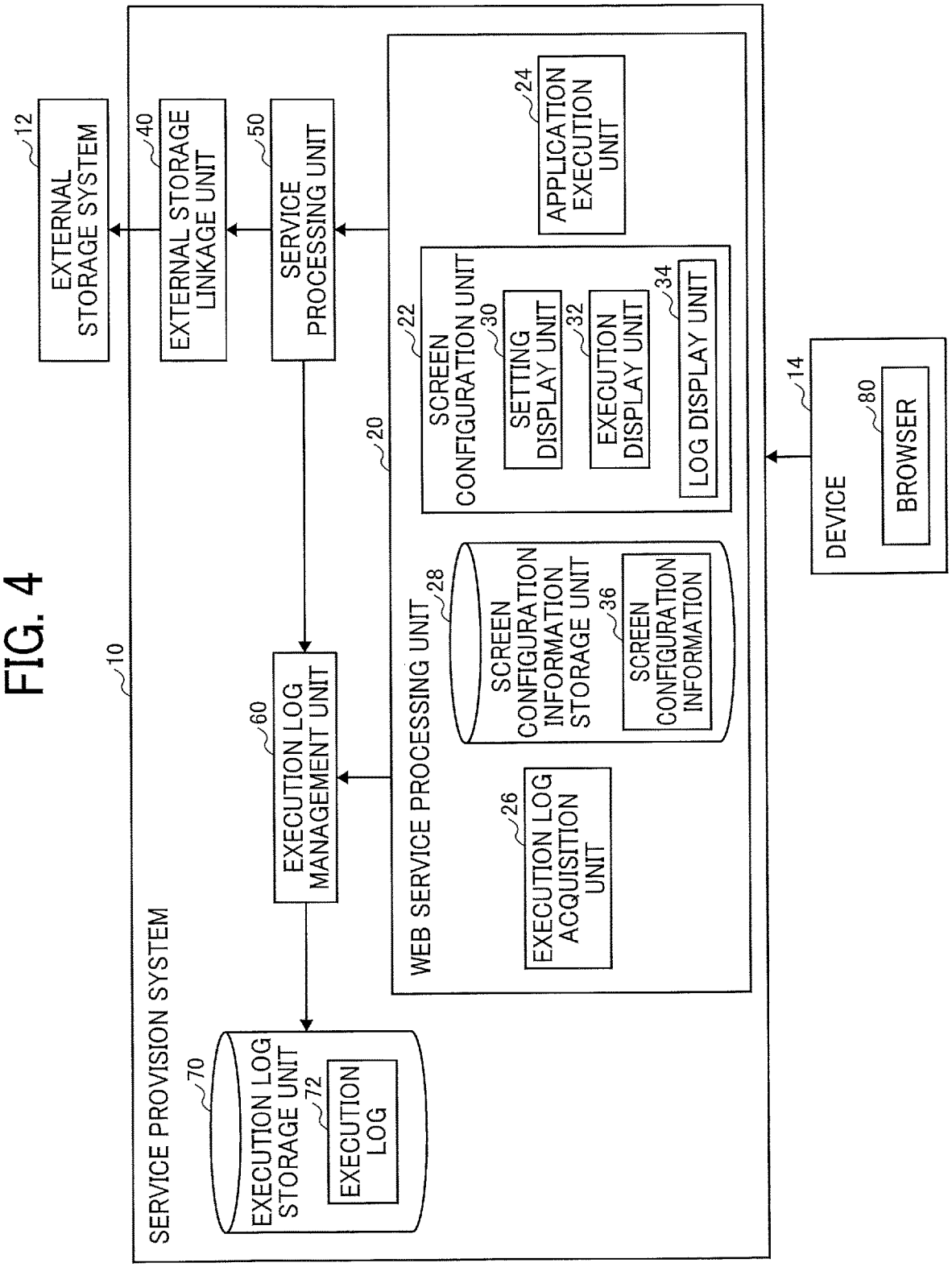
FIG. 4 is a block diagram illustrating an example of a functional configuration of the information processing system, according to an embodiment of the present disclosure.

FIG. 4 is a block diagram illustrating an example of the functional configuration of the information processing system 1 according to the present embodiment. The device 14 illustrated in FIG. 4 includes a browser 80. The user of the device 14 uses the service provision system 10 via the browser 80. In the example illustrated in FIG. 4, the information processing system 1 uses a Web application; however, the information processing system 1 may use a native application having the same function as that of a Web service processing unit 20 described later.

The service provision system 10 illustrated in FIG. 4 includes the Web service processing unit 20, an external storage linkage unit 40, a service processing unit 50, an execution log management unit 60, and an execution log storage unit 70. The external storage linkage unit 40, the service processing unit 50, and the execution log management unit 60 are implemented by the process which one or more programs installed in the service provision system 10 causes the CPU 501 to execute. The Web service processing unit 20 is implemented by the process which is downloaded by the browser 80 of the device 14 in a format such as JavaScript (registered trademark) or Cascading Style Sheets (CSS) and is executed by the CPU 901.

The Web service processing unit 20 performs a process for the user to use various services of the service provision system 10 via the browser 80 of the device 14 or a browser of the PC terminal 16. In the example described below, the user uses various services of the service provision system 10 via the browser 80 of the device 14.

The Web service processing unit 20 includes a screen configuration unit 22, an application execution unit 24, an execution log acquisition unit 26, and a screen configuration information storage unit 28. The screen configuration information storage unit 28 stores screen configuration information 36. The screen configuration information 36 is information for generating the screen data on the screen (configuring the screen) to be displayed on the browser 80 of the device 14.

The screen configuration unit 22 acquires the screen configuration information 36 from the screen configuration information storage unit 28 to configure various screens described later. The screen configuration unit 22 includes a setting display unit 30, an execution display unit 32, and a log display unit 34.

The setting display unit 30 causes a plurality of input fields 1052, 1054, 1056, 1058, 1060, 1068, 1070, 1072, 1074, and 1076 (hereinafter referred to as the plurality of input fields 1052, etc.) to be displayed on the operation screen described later and performs a process in accordance with the user's setting operation for setting values for a process in the plurality of input fields 1052, etc. The execution display unit 32 causes a start button to be displayed on the operation screen described later and makes an execution request for the process corresponding to the values set in the plurality of input fields 1052, etc. in response to the accepted user's setting operation to press the start button. The log display unit 34 causes an execution log button to be displayed on the operation screen described later and performs a process in accordance with the operation to press the execution log button. Thus, the browser 80 of the device 14 displays the operation screen described later.

The application execution unit 24 requests the service processing unit 50, the scanner unit 931, and the printer unit 932 in the device 14 to execute various processes in response to a request from the browser 80 of the device 14. The external storage linkage unit 40 gives various requests to the external storage system 12 to refer to a list of files and download or upload a file. The service processing unit 50 performs processing related to the services provided by the service provision system 10.

The execution log acquisition unit 26 of the Web service processing unit 20 requests an execution log (execution log information) from the execution log management unit 60 to acquire the execution log. In response to the execution log request from the execution log acquisition unit 26, the execution log management unit 60 reads an execution log 72 from the execution log storage unit 70, in which the execution log 72 is stored, and provides the execution log 72 to the execution log acquisition unit 26. The Web service processing unit 20, the external storage linkage unit 40, the service processing unit 50, the execution log management unit 60, the execution log storage unit 70, and the like, may be implemented by using the different computers 500.

Figure 5:
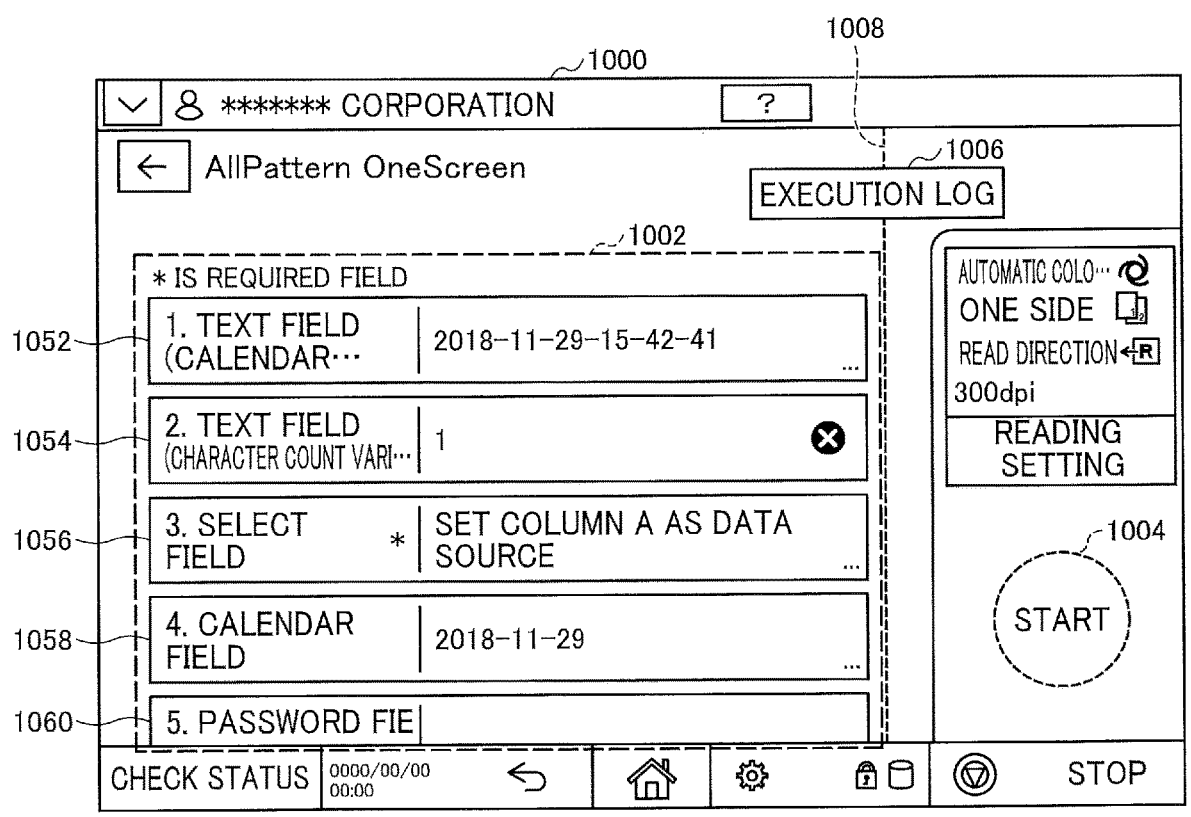
FIG. 5 is a schematic diagram illustrating an example of an operation screen, according to an embodiment of the present disclosure.

The screen configuration unit 22 configures an operation screen 1000 illustrated in for example FIG. 5. FIG. 5 is a schematic diagram illustrating an example of the operation screen 1000 according to the present embodiment. The browser 80 causes the operation screen 1000 to be displayed on the panel display 940a of the device 14. The operation screen 1000 includes a setting area 1002, a start button 1004, and an execution log button 1006.

The setting area 1002 is an area where the plurality of input fields 1052, etc. for accepting the user's setting operation for setting various setting values for the execution of a job are arranged side by side in a vertical direction of the operation screen 1000. The start button 1004 is a button for accepting the user's setting operation to request the execution of a job. The user performs a setting operation as appropriate on the setting area 1002 and then presses the start button 1004 so as to start the execution of a job.

The user presses the execution log button 1006 to display the job execution log on the panel display 940a so as to confirm a job execution result. In other words, without pressing the execution log button 1006, the user is not able to notice an error as the job execution result. For this reason, in the device 14 according to the present embodiment, the execution log button 1006 is provided at such a position that the user can easily notice the execution log button 1006 and the operability of the execution log button 1006 is improved so that it is easier for the user to confirm the job execution result.

In the example of the operation screen 1000 illustrated in FIG. 5, the execution log button 1006 is provided at a position in consideration of the uncomfortable feeling of the user as an example of the position that can be easily noticed by the user. On the operation screen 1000 illustrated in FIG. 5, as the execution log button 1006 is misaligned from the setting area 1002, the user can easily notice the execution log button 1006.

Specifically, on the operation screen 1000 illustrated in FIG. 5, the execution log button 1006 is provided at the position across a vertical axis 1008 passing through the right end at the side of the start button 1004 out of the right end and the left end of the setting area 1002 in a horizontal direction. As the execution log button 1006 is misaligned from the setting area 1002 in the direction of the movement route of the user's finger from the setting area 1002 to the start button 1004, the position of the execution log button 1006 illustrated in FIG. 5 gives the user an uncomfortable feeling and causes the user to easily notice the execution log button 1006.

Figure 6:
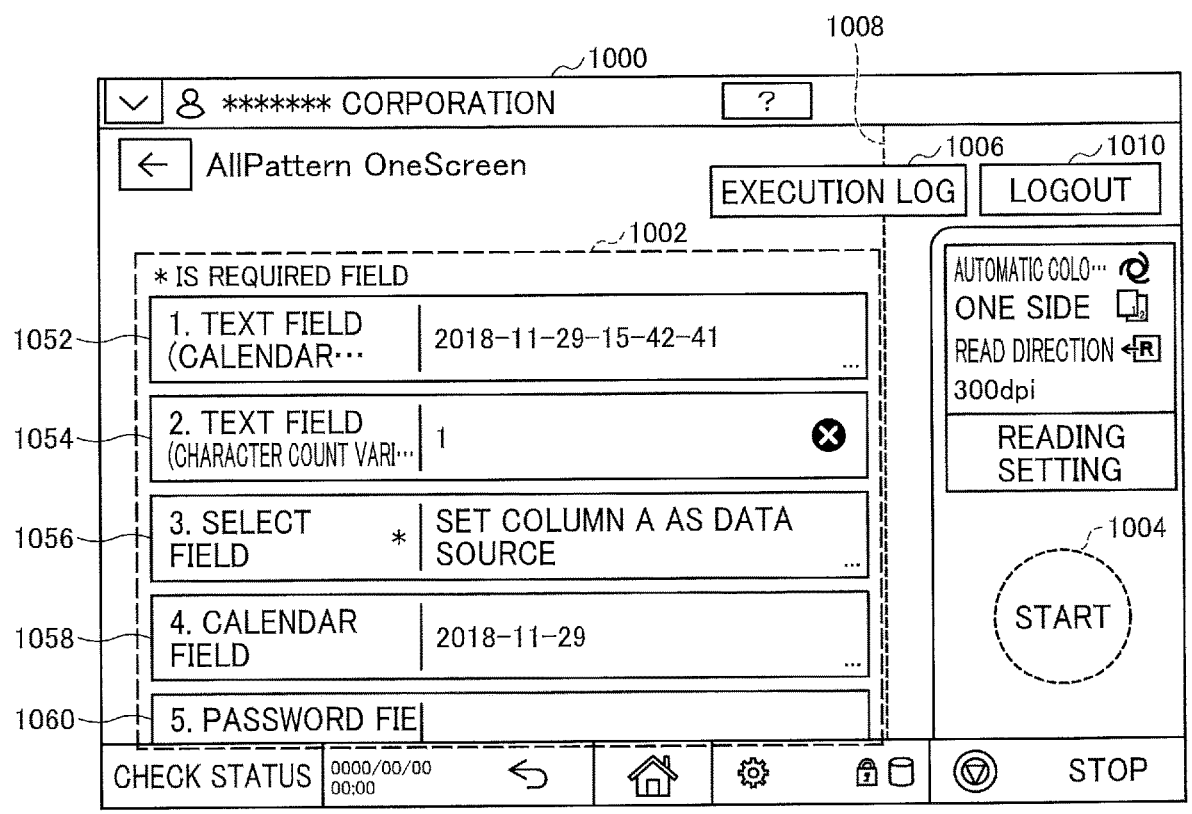
FIG. 6 is a schematic diagram illustrating an example of the operation screen, according to an embodiment of the present disclosure.

Even when a logout button 1010 is provided on the right side of the execution log button 1006 as illustrated in for example FIG. 6, the position of the execution log button 1006 illustrated in FIG. 5 is easily noticed by the user. FIG. 6 is a schematic diagram illustrating an example of the operation screen 1000 according to the present embodiment.

Process

Figure 7:
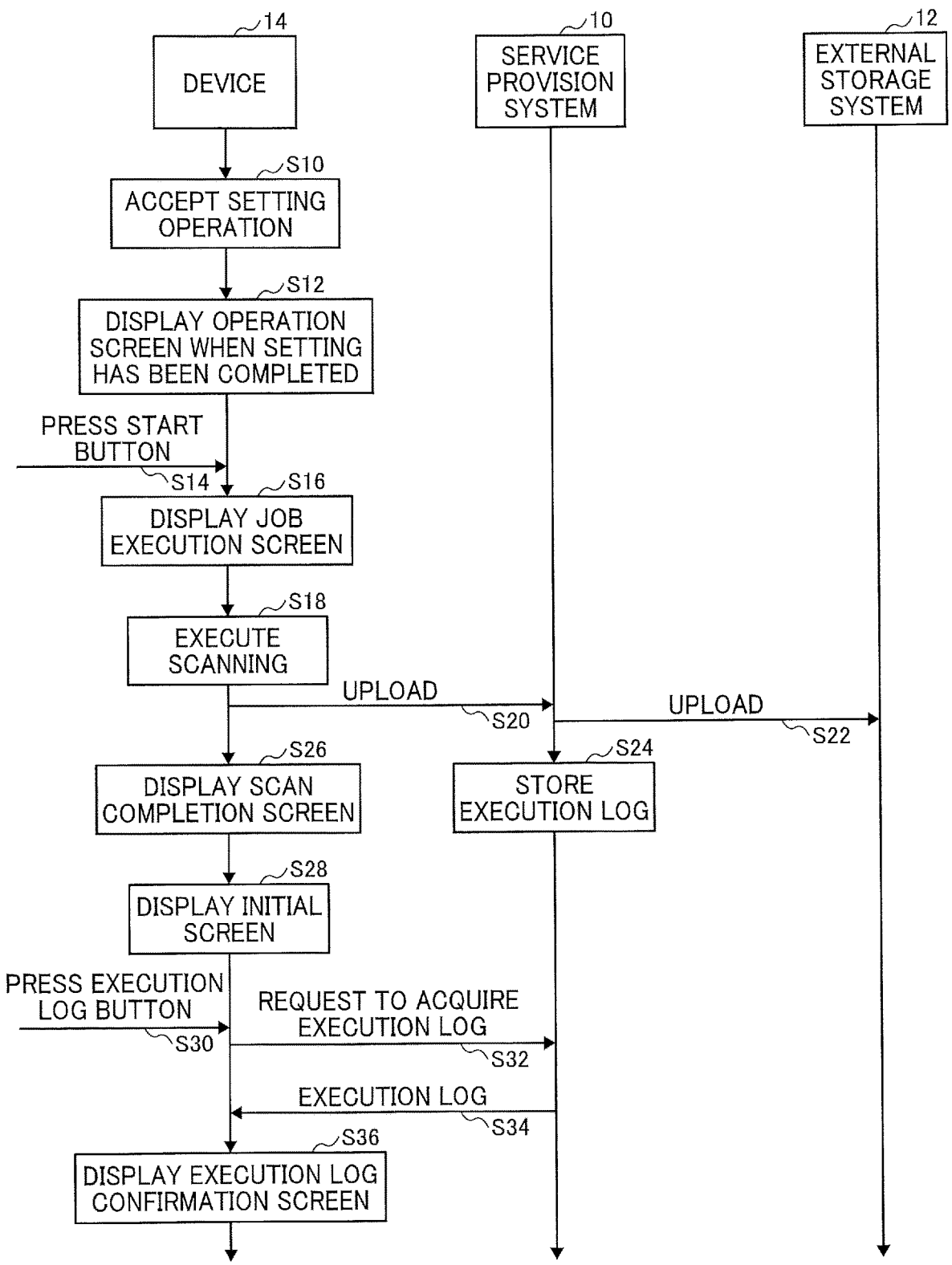
FIG. 7 is a sequence diagram illustrating an example of a process performed by the information processing system, according to an embodiment of the present disclosure.

Next, a process of the information processing system 1 according to the present embodiment is described. FIG. 7 is a sequence diagram illustrating an example of the process of the information processing system 1 according to the present embodiment. For example, FIG. 7 illustrates a process in which the device 14 executes scanning and uploads the scan data to an external storage system.

At Step S10, the user operates the device 14 to perform a job setting operation in the setting area 1002 of the operation screen 1000 displayed on the panel display 940a as illustrated in FIG. 5. The screen configuration unit 22 of the device 14 accepts the setting operation for setting a value for the job from the user through the plurality of input fields 1052, etc. in the setting area 1002. As the job setting has not been completed on the operation screen 1000 in FIG. 5, the start button 1004 is not allowed to be pressed.

Figure 8:
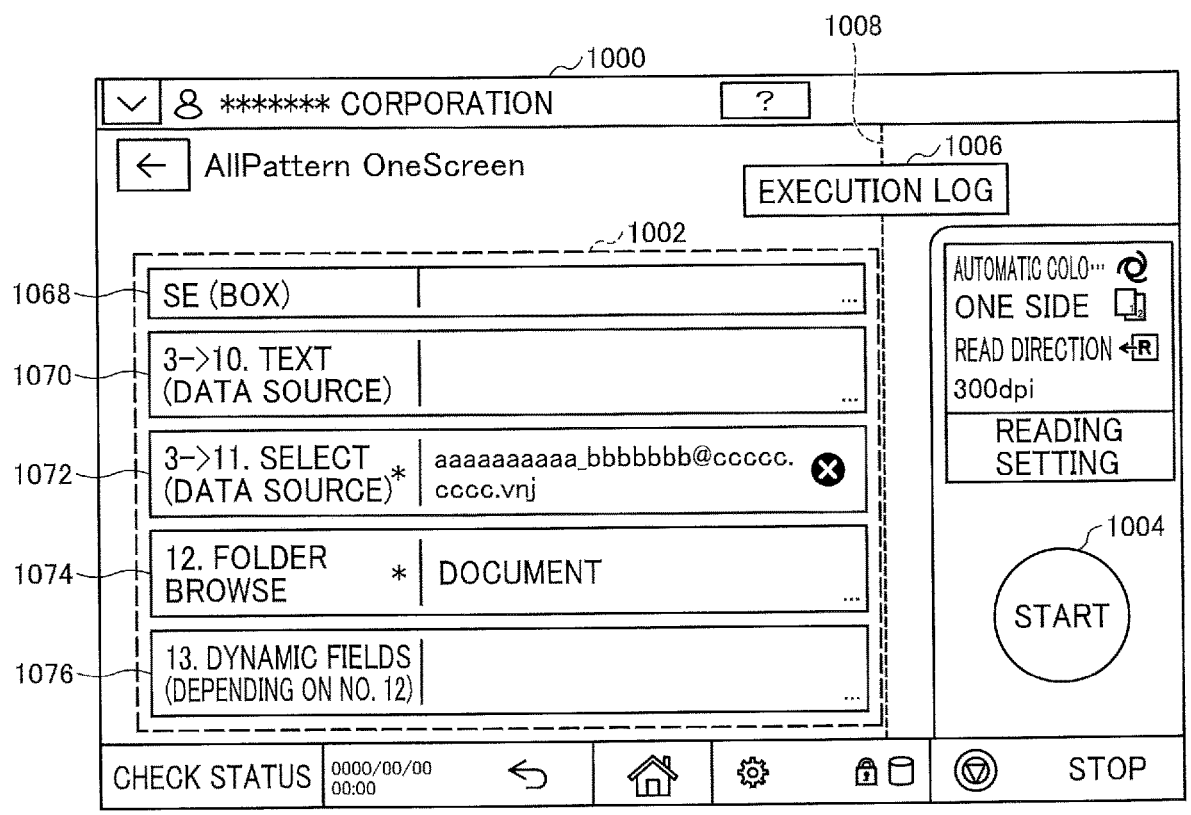
FIG. 8 is a schematic diagram illustrating an example of the operation screen when a setting has been completed, according to an embodiment of the present disclosure.

When the job setting has been completed and the job is ready to be started, the screen configuration unit 22 of the device 14 causes the panel display 940a to display the operation screen 1000 illustrated in FIG. 8 at Step S12. FIG. 8 is a schematic diagram illustrating an example of the operation screen 1000 when the setting has been completed. On the operation screen 1000 illustrated in FIG. 8, the start button 1004 is allowed to be pressed as the job setting has been completed.

Figure 9:
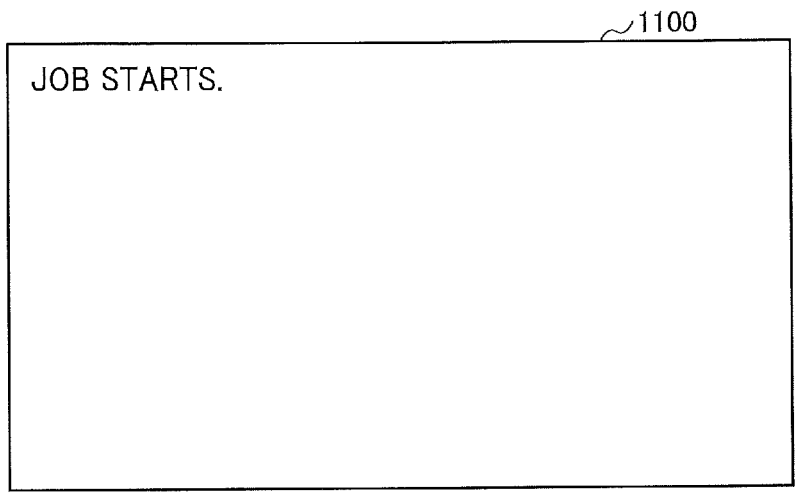
FIG. 9 is a schematic diagram illustrating an example of a job execution screen, according to an embodiment of the present disclosure.

At Step S14, the user operates the device 14 to press the start button 1004 on the operation screen 1000 displayed on the panel display 940a as illustrated in FIG. 8. The screen configuration unit 22 of the device 14 accepts the operation for pressing the start button 1004 from the user. At Step S16, the screen configuration unit 22 of the device 14 causes the panel display 940a to display a job execution screen 1100 as illustrated in FIG. 9 so as to notify the user of the start of the job.

At Step S18, the application execution unit 24 of the device 14 causes the scanner unit 931 of the engine control unit 930 to scan the document based on the settings of the job. At Step S20, the application execution unit 24 uploads the scan data to the service processing unit 50 of the service provision system 10. At Step S22, the external storage linkage unit 40 of the service provision system 10 uploads the scan data to the external storage system 12. At Step S24, the execution log management unit 60 of the service provision system 10 stores the execution log 72 in the execution log storage unit 70. Thus, the service provision system 10 stores the execution log of jobs executed by the user.

Figure 10:
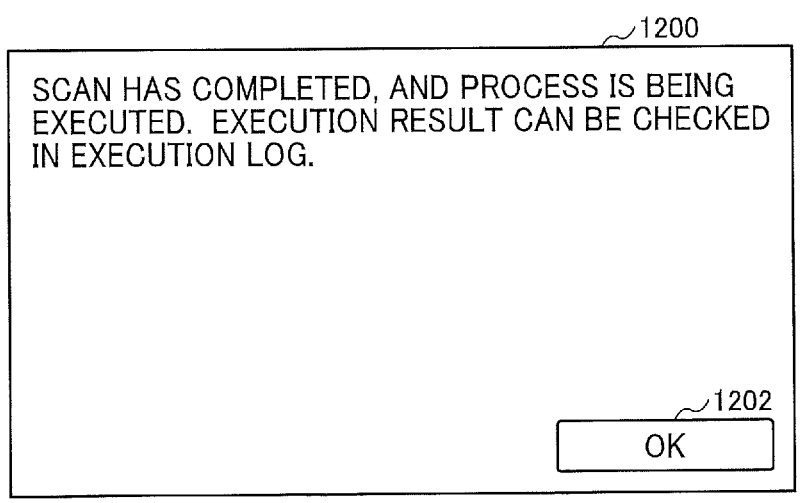
FIG. 10 is a schematic diagram illustrating an example of a scan completion screen, according to an embodiment of the present disclosure.

After uploading the scan data to the service processing unit 50 of the service provision system 10 at Step S20, the device 14 causes the panel display 940a to display a scan completion screen 1200 as illustrated in FIG. 10 at Step S26 so as to notify the user that he or she can confirm a job execution result in the execution log.

When the user presses an OK button 1202 on the scan completion screen 1200, the screen configuration unit 22 of the device 14 causes the panel display 940a to display the operation screen 1000 as the initial screen where the start button 1004 is not allowed to be pressed as illustrated in FIG. 5 at Step S28. As described above, as the execution log button 1006 on the operation screen 1000 is displayed at the position to give the user an uncomfortable feeling, the user easily notices the execution log button 1006.

As the user can notice the execution log button 1006, the information processing system 1 according to the present embodiment improves the operability of the execution log button 1006 and increase the probability that the user confirms the execution result of a job. At Step S30, the user operates the device 14 to press the execution log button 1006 on the operation screen 1000 displayed on the panel display 940a as illustrated in FIG. 5. The screen configuration unit 22 of the device 14 accepts the operation for pressing the execution log button 1006 from the user.

At Step S32, the execution log acquisition unit 26 of the device 14 transmits an execution log acquisition request to the execution log management unit 60 of the service provision system 10. The execution log management unit 60 of the service provision system 10 reads the execution log 72 from the execution log storage unit 70 and provides the execution log to the device 14 at Step S34.

At Step S36, the screen configuration unit 22 causes the panel display 940a to display an execution log confirmation screen 1300 as illustrated in FIG. 11, which includes an execution log 1310, so that the user is prompted to confirm the job status, such as completion or error, as a job execution result.

As described above, in the information processing system 1 according to the present embodiment, the execution log button 1006 for accepting a job execution log display operation from the user is noticeably displayed on the operation screen 1000, and therefore the operability of the execution log button 1006 is improved. Although the execution log button 1006 is described as an example in the present embodiment, any button that accepts the operation for displaying the information to be confirmed by the user can be applied.

Second Embodiment

On the operation screen 1000 illustrated in FIG. 5 according to the first embodiment, the execution log button 1006 is provided at a position in consideration of an uncomfortable feeling of the user as an example of the position that can be easily noticed by the user. According to a second embodiment of the present disclosure, the execution log button 1006 is provided at a position that easily comes within the sight of the user during the operation for executing a job on the ground that the user's line of sight moves in a Z-shape (in the order of the upper left, the upper right, the lower left, and then the lower right on the operation screen 1000). The position that easily comes within the sight of the user during the operation for executing a job is, for example, the space between the plurality of input fields 1052, etc. arranged in the setting area 1002 side by side in the vertical direction and the start button 1004. The space between the plurality of input fields 1052, etc. and the start button 1004 according to the second embodiment includes the position overlapped with the start button 1004 in the horizontal direction of the operation screen 1000.

Figure 12:
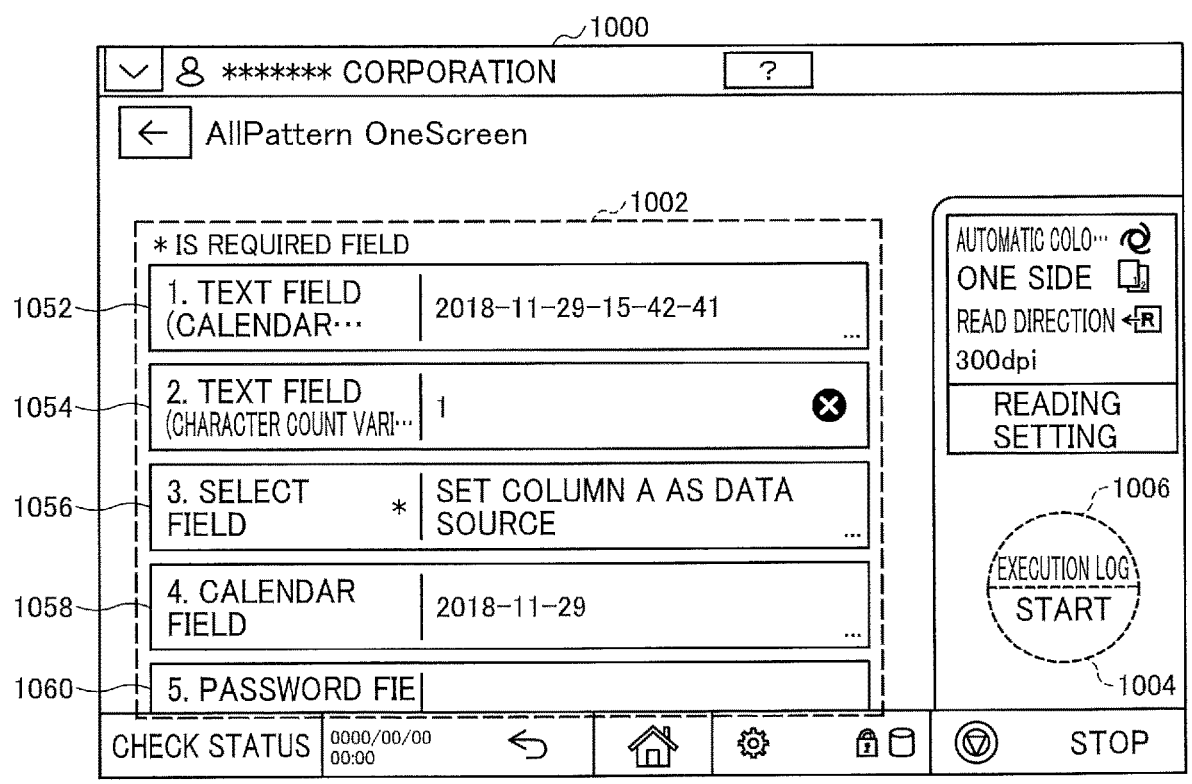
FIG. 12 is a diagram illustrating an example of the operation screen, according to an embodiment of the present disclosure.
Figure 13:
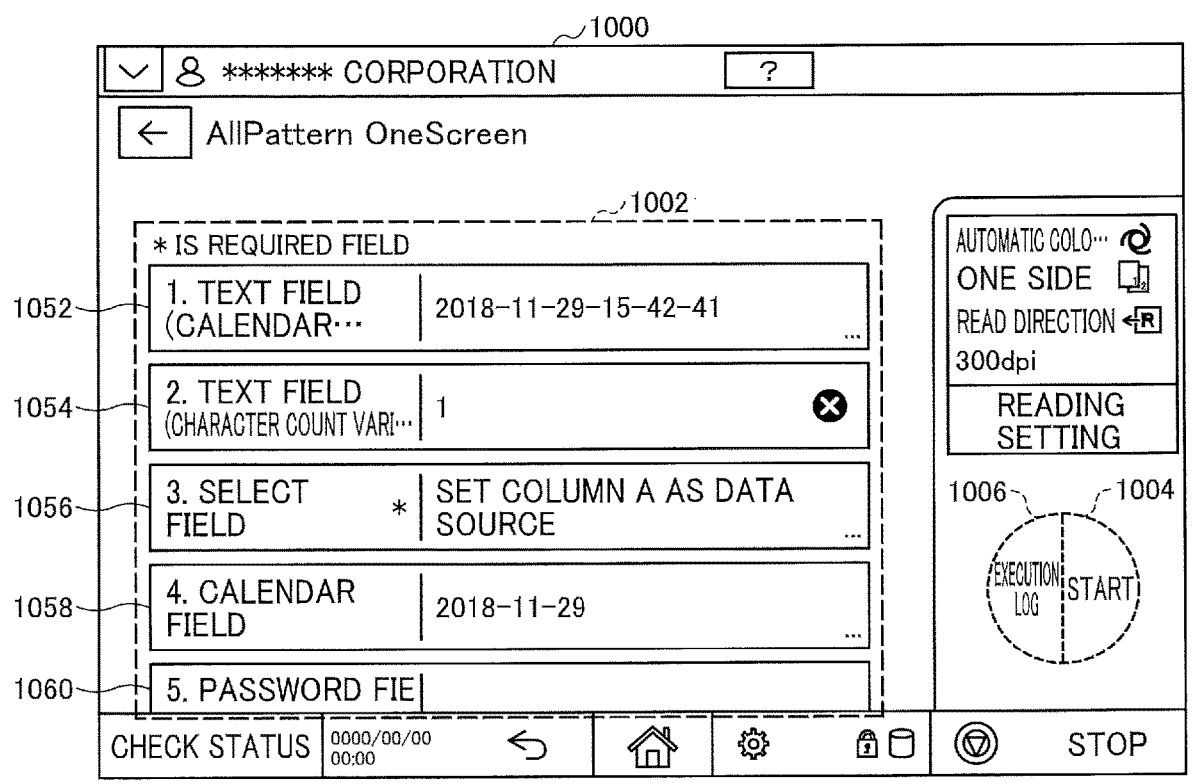
FIG. 13 is a diagram illustrating an example of the operation screen, according to an embodiment of the present disclosure.

FIG. 12 is a schematic diagram illustrating an example of the operation screen 1000 according to the present embodiment. FIG. 13 is a schematic diagram illustrating an example of the operation screen 1000 according to the present embodiment. On the operation screen 1000 illustrated in the examples of FIGS. 12 and 13, the execution log button 1006 is provided at the position adjacent to the start button 1004 as a position that easily comes within the sight of the user during the operation for executing a job.

Figure 14:
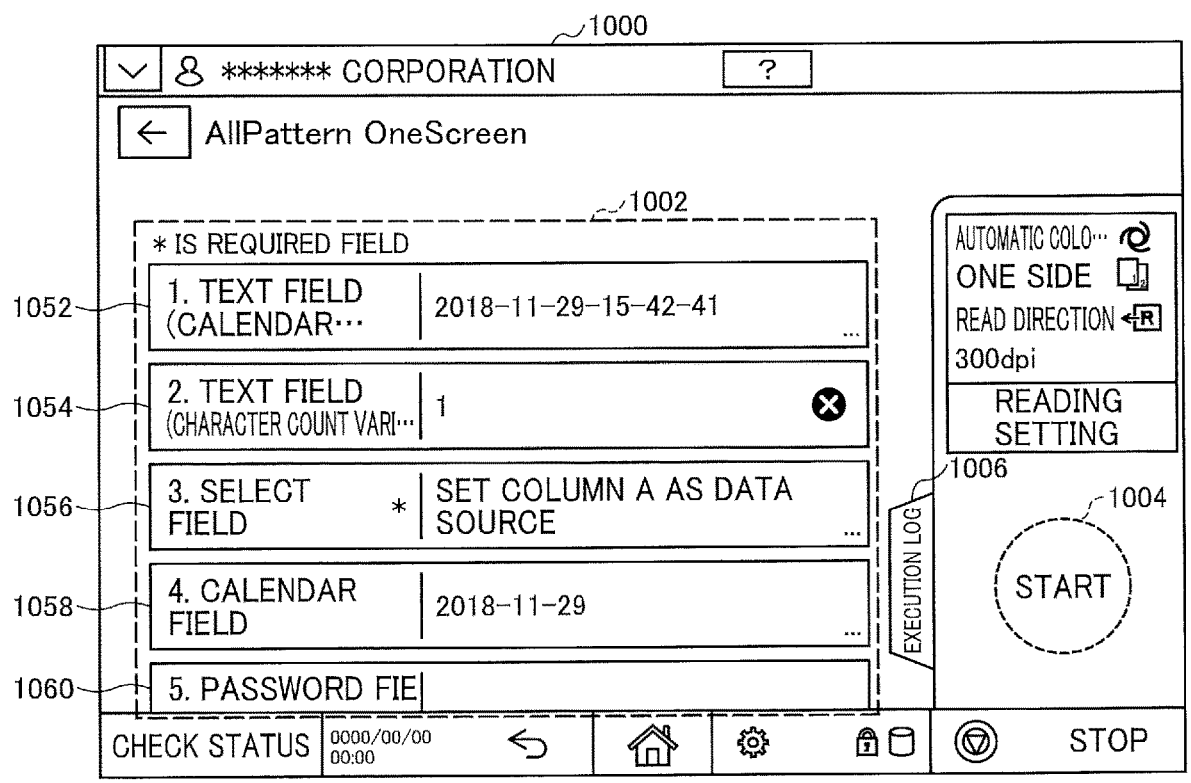
FIG. 14 is a diagram illustrating an example of the operation screen, according to an embodiment of the present disclosure.

The execution log button 1006 may be provided as illustrated in FIG. 14. FIG. 14 is a schematic diagram illustrating an example of the operation screen 1000 according to the present embodiment. On the operation screen 1000 illustrated in the example of FIG. 14, the execution log button 1006 is provided at a position between the setting area 1002 and the start button 1004 as a position that easily comes within the sight of the user during the operation for executing a job.

As described above, in the information processing system 1 according to the present embodiment, the execution log button 1006 that accepts a job execution log display operation from the user can be noticeably displayed on the operation screen 1000. Although the execution log button 1006 is described as an example in the present embodiment, any button that accepts the operation for displaying the information to be confirmed by the user may be applied.

Third Embodiment

Figure 15:
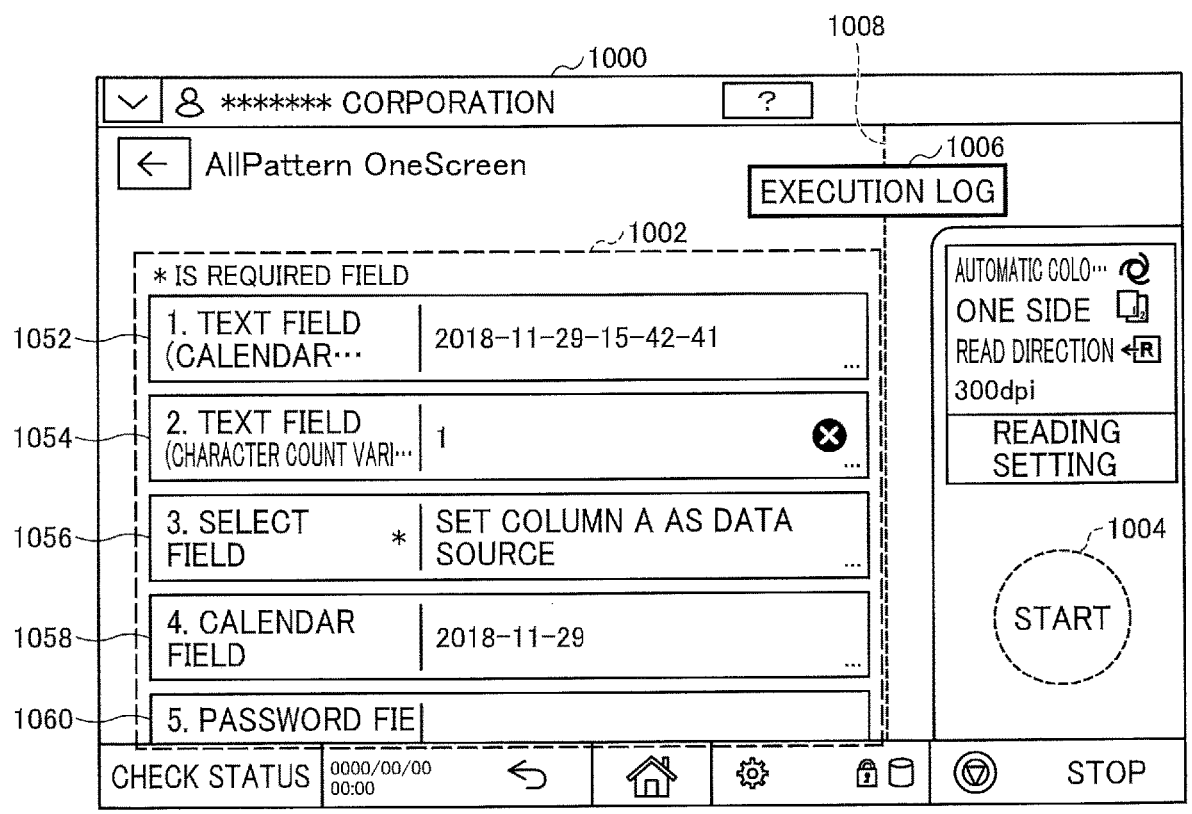
FIG. 15 is a diagram illustrating an example of the operation screen, according to an embodiment of the present disclosure.

According to a third embodiment of the present disclosure, the display form of the execution log button 1006 is changed from the normal so as to be noticeable as on the operation screen 1000 illustrated in FIG. 15 in a case where the execution log of the job that has not been confirmed by the user indicates an error and in a case where the setting in the setting area 1002 is identical to the job setting that has previously caused an error. FIG. 15 is a schematic diagram illustrating an example of the operation screen 1000 according to the present embodiment. The operation screen 1000 illustrated in FIG. 15 is an example where the execution log button 1006 is highlighted, e.g., the color of the execution log button 1006 is changed, an icon is added, the execution log button 1006 is flashed, or the execution log button 1006 is surrounded with a bold line.

Figure 16:
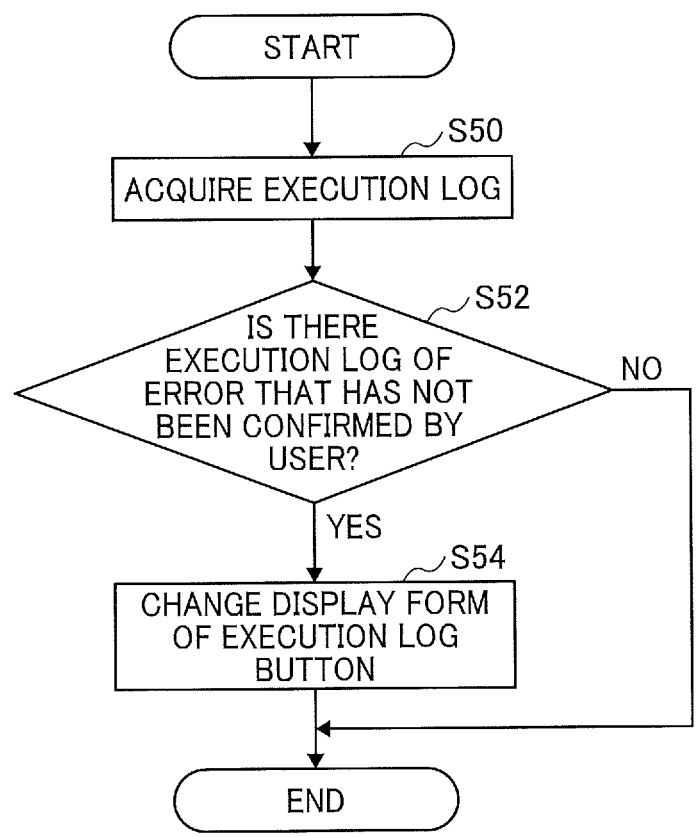
FIG. 16 is a flowchart illustrating an example of a process of changing a display form of an execution log button in a case where the execution log of the most recent job indicates an error, according to an embodiment of the present disclosure.

FIG. 16 is a flowchart illustrating an example of the process to change the display form of the execution log button 1006 in a case where the execution log of the most recent job indicates an error. At Step S50, the execution log acquisition unit 26 of the device 14 acquires the execution log 72 of the user who operates the device 14 from the execution log management unit 60 of the service provision system 10.

At Step S52, the screen configuration unit 22 of the device 14 determines whether the execution log 72 acquired at Step S50 includes the execution log of an error that has not been confirmed by the user. When the screen configuration unit 22 determines that there is the execution log of an error that has not been confirmed by the user (Yes at Step S52), the screen configuration unit 22 changes the display form of the execution log button 1006 at Step S54. This allows the user to easily recognize that an error has occurred in the executed job. When the screen configuration unit 22 determines that there is no execution log of an error that has not been confirmed by the user (No at Step S52), the operation at Step S54 is skipped so that the display form of the execution log button 1006 is not changed. Due to the process in the flowchart illustrated in FIG. 16, the display form of the execution log button 1006 is changed from the normal so as to be highlighted in a case where there is the execution log of an error that has not been confirmed by the user.

FIG. 17 is a flowchart illustrating an example of the process to change the display form of the execution log button 1006 in a case where the setting in the setting area 1002 is identical to the job setting that has previously caused an error. The screen configuration unit 22 of the device 14 determines whether the jog setting has been completed at Step S60. When the screen configuration unit 22 determines that the jog setting has been completed (Yes at S60), the process proceeds to Step S62. At Step S62, the execution log acquisition unit 26 of the device 14 acquires the execution log 72 of the user who operates the device 14 from the execution log management unit 60 of the service provision system 10. Then, the process proceeds to Step S64. By contrast, when the screen configuration unit 22 determines that the jog setting has not been completed (No at S60), the operation at Step S60 is repeatedly performed.

At Step S64, the screen configuration unit 22 of the device 14 determines whether the execution log 72 acquired at Step S62 includes the execution log having the job setting identical to the job setting completed in the setting area 1002 and the execution log indicates an error. When the screen configuration unit 22 determines that the execution log 72 acquired at Step S62 includes the execution log having the job setting identical to the job setting completed in the setting area 1002 and the execution log indicates an error (Yes at Step 64), the screen configuration unit 22 changes the display format of the execution log button 1006 at Step S66. When the screen configuration unit 22 determines that the execution log 72 acquired at Step S62 does not include the execution log having the job setting identical to the job setting completed in the setting area 1002 or when the screen configuration unit 22 determines that the execution log 72 acquired at Step S62 includes the execution log having the job setting identical to the job setting completed in the setting area 1002 but the execution log does not indicate an error (No at Step 64), the process ends. Thus, the user can easily recognize that an error has previously occurred with the job setting completed in the setting area 1002.

Fourth Embodiment

The first embodiment to the third embodiment can be combined. For example, the execution log button 1006 is provided at the position illustrated in FIG. 5 at normal times, and the execution log button 1006 is movable to the positions illustrated in FIGS. 12 to 14 when there is the execution log of an error that has not been confirmed by the user. The position of the execution log button 1006 is moved in this manner so that it is possible to further give an uncomfortable feeling to the user, cause the user to notice the execution log button 1006 more easily, and improve the operability of the execution log button 1006.

Furthermore, the execution log button 1006 is moved from the position illustrated in FIG. 5 to the positions illustrated in FIGS. 12 to 14 and then the display form of the execution log button 1006 is changed as illustrated in FIG. 15 so that it is possible to further give an uncomfortable feeling to the user, cause the user to notice the execution log button 1006 more easily, and improve the operability of the execution log button 1006.

In recent years, due to the widespread use of cloud services or the like, image data is processed by extraneous sources other than the MFP and then the processed image is distributed. In this case, sometimes an error occurs during the process that is executed by extraneous sources other than the MFP, for example. For this reason, the importance of confirming the execution result of the process is getting more important. However, a job execution log button is hidden or displayed at a position that is hard to recognize, because there are other buttons for various functions (a login function, a stop function, an execution function, etc.) and the system-related buttons (a home button, an energy-saving button, etc.) displayed on the operation screen of the MFP, which results in an undesirable operability.

According to one or more embodiments of the present disclosure, an information processing terminal is provided that can improve an operability of operation of display a processing log by a user.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The start button 1004 is an example of a first object. The execution log button 1006 is an example of a second object.

The invention claimed is:

1. An information processing terminal comprising one or more processors configured to:
    display a plurality of input fields to which setting values for a process are to be input, the plurality of input fields being arranged side by side in a vertical direction of an operation screen displayed on the information processing terminal;
    display a first object that receives an execution request operation for the process from a user, the first object being provided at a lower right of the operation screen;

cause the process to be performed based on the setting values in the plurality of input fields in response to the execution request operation for the process received from the user;

display a second object that accepts a job execution log display operation for the process from a user, the job execution log being a log of jobs executed by the user, the second object being disposed closer to the plurality of input fields than the first object in a lengthwise direction of the operation screen; and display a log of the process in response to the job execution log display operation for the process received from the user.

2. The information processing terminal according to claim 1, wherein the one or more processors are further configured to display the second object at a position adjacent to the first object displayed on the operation screen.

3. The information processing terminal according to claim 1, wherein the one or more processors are further configured to change a display form of the second object in accordance with an error included in the log of the process.

4. An information processing system comprising:
an information processing terminal configured to display an operation screen; and
an information processing apparatus configured to execute at least part of a process for which a setting operation is received through the operation screen, the information processing terminal including one or more first processors configured to:
display a plurality of input fields to which setting values for a process are to be input, the plurality of input fields being arranged side by side in a vertical direction of the operation screen;
display a first object that receives an execution request operation for the process from a user, the first object being provided at a lower right of the operation screen;
cause the process to be performed based on the setting values in the plurality of input fields in response to the execution request operation for the process received from the user;
display a second object that receives a job execution log display operation for the process from a user, the job execution log being a log of jobs executed by the user, the second object being disposed closer to the plurality of input fields than the first object in a lengthwise direction of the operation screen; and
display a log of the process in response to the job execution log display operation for the process received from the user, and
the information processing apparatus including one or more second processors configured to:
execute at least part of the process; and
provide log information on the executed at least part of the process to the information processing terminal.

5. An operation screen display method performed by an information processing terminal configured to display an operation screen, the operation screen display method comprising:
displaying a plurality of input fields to which setting values for a process are to be input, the plurality of input fields being arranged side by side in a vertical direction of the operation screen;
displaying a first object that receives an execution request operation for the process from a user, the first object being provided at a lower right of the operation screen;
causing the process to be performed based on the setting values in the plurality of input fields in response to the execution request operation for the process received from the user;
displaying a second object that receives a job execution log display operation for the process from a user, the job execution log being a log of jobs executed by the user, the second object being disposed closer to the plurality of input fields than the first object in a lengthwise direction of the operation screen; and
displaying a log of the process in response to the log display operation for the process received from the user.

* * * * *